Patented Mar. 10, 1953

2,631,142

UNITED STATES PATENT OFFICE 2,631,142

CATALYST ACTIVATOR FOR DIOLEFIN POLYMERIZATION

Harry Leverne Williams and Joseph Maxwell Mitchell, Sarnia, Ontario, Canada, assignors to Polymer Corporation Limited, Sarnia, Ontario, Canada, a corporation of Canada No Drawing. Application June 15, 1949, Serial No. 99,346

22 Claims. (Cl. 260—82.5)

This invention relates generally to the catalysing of free radical initiated polymerization systems by metal-organic complexes. More particularly it relates to catalyst activation of peroxy induced free radical polymerization systems by soluble sequestered ions of heavy metals in combination with organic chelate-complex forming reagents.

In the customary method of polymerizing conjugated dienes such as butadiene, isoprene, dimethylbutadiene, chloroprene, methylpentadiene, and others, with or without vinyl compounds such as styrene, acrylonitrile, methylmethacrylate or similar compounds the monomers are reacted in aqueous emulsion in the presence of emulsifiers, catalysts, modifiers or regulators, activators, promoters and other suitable additives. In the temperature range 86° F. to 150° F. the reaction proceeds at rates which are practical for commercial production when such well known initiators as potassium persulfate, hydrogen peroxide and other peroxy compounds are used. It is the general feeling in the art, however, that superior polymerization products are to be obtained by carrying out the reaction at much lower temperatures. At these lower temperatures the effectiveness of the generally accepted catalysts or initiators such as persulfates, hydrogen peroxide, and organic hydroperoxides or diperoxides is markedly reduced so that the reaction time to a practical degree of hydrocarbon conversion may be many days or weeks. The use of certain heavy metal inorganic complexes has been found to restore the effectiveness of the catalysts or initiators to the point where the rate of reaction at the lower temperatures is comparable with that experienced at higher temperatures without the use of such complexes.

Ferrous pyrophosphate has been favoured among the known activators and in some respects is satisfactory. The preparation and application, however, is often quite critical. For optimal results it may be necessary to dissolve separately one or both of the components used in its preparation and to add one to the other in a particular manner and at a definite rate. A suspension of the relatively insoluble pyrophosphate varying from a thick paste to a faintly milky "solution" is thus achieved. A rapid deterioration of this suspension, when in contact with air, may be expected particularly if optimal results can be achieved only by aging or conditioning the suspension at elevated temperatures for even a brief interval of time. Also the suspension seems to change its activity with time due to possible physical changes thereby requiring close supervision of the reaction and adjustments in the amount of pyrophosphate activator used. Being a suspension or a sludge constant agitation is necessary if the metallic ion concentration is to be uniform throughout. For the same reason it is more difficult to transfer, to meter accurately, and hence to control the rate and quantity of addition. Of the ferrous ions introduced into the system a certain proportion may become incorporated into the polymerization product in spite of the best washing techniques. This is considered to be a further disadvantage as the presence of certain metals is thought to increase the heat softening tendencies of the rubber in the driers and to reduce the age resisting qualities of the rubber produced.

The preparation and application of such additives to low temperature peroxide initiated free radical polymerization systems is illustrated by the following generally accepted recipes:

RECIPE A

| | Parts by weight |
|---|---|
| Butadiene | 71 |
| Styrene | 29 |
| Tertiary mercaptan | 0.2 |
| Tri sodium phosphate decahydrate | 0.5 |
| Emulsifier—sodium salt of a disproportionated rosin acid. | 5.0 |
| Sodium hydroxide | 0.05 |
| Water—total | 180.00 |
| Cumene hydroperoxide | 0.15 |
| Glucose 100% | 1.98 |
| Sodium pyrophosphate | 0.36 |
| Ferrous sulfate heptahydrate | 0.10 |

RECIPE B

| | Parts by weight |
|---|---|
| Butadiene | 71 |
| Styrene | 29 |
| Tertiary mercaptan | 0.24 |
| Potassium chloride | 0.5 |
| Emulsifier—potassium salt of a disproportionated rosin acid. | 4.7 |
| Dispersing agent [1] | 0.1 |
| Potassium hydroxide | 0.13 |
| Water | 180.00 |
| Cumene hydroperoxide | 0.10 |
| Dextrose 100% | 1.0 |
| Potassium pyrophosphate | 0.177 |
| Ferrous sulfate heptahydrate | 0.14 |

[1] Believed to be a naphthalene sulfonate-formaldehyde polymer.

The last three components, the sugar, the pyrophosphate and the ferrous sulfate are normally added to the charge as an activator.

In the normal practice of Recipe A to 10 parts of water add the pyrophosphate, the sugar and the ferrous sulfate. This is brought to a boil for 5–10 minutes to digest the sugar. The suspension or sludge formed is brought up to weight by adding boiled water. In the practice of Recipe B the sugar is digested in 40 parts of 0.1 KOH until the pH has decreased below 10; i. e. by boiling for approximately ten minutes. The activator is prepared by dissolving the ferrous sulfate decahydrate and the potassium pyrophosphate separately, each in 5 parts of water at 140° F. The two solutions are then mixed by pouring slowly with stirring and under a blanket of nitrogen the ferrous sulfate solution into the solution of pyrophosphate. The mixture is then maintained at 140° F. for 15–30 minutes, preferably in the absence of oxygen. The sugar digestion solution is usually charged separately from the activator which may be added before but preferably after the hydrocarbons and before or after the catalyst. The less satisfactorly results to be expected when this critical routine is varied will be fully demonstrated below.

It is the object of this invention to effectively increase the rate of reaction in such peroxide-initiated free-radical polymerization systems at such reduced temperatures through the introduction of an additive which does not embody any of the disadvantages enumerated above and which is easily prepared in some cases without heating, is completely soluble, and is stable.

It has been found that through the use of organic chelate complexes of certain heavy metals derived particularly from compounds containing the group

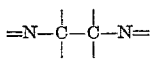

the reaction may be adjusted to a desirable rate. Of particular value are certain of the compounds derived from ammonia, amines or polyamines N-substituted with two or more carboxyl, alkyl carboxyl, or aryl carboxyl groups. In addition to the apparent advantages of a very soluble and very stable activator an additional and unexpected advantage resulting from the practice of this invention is that appreciably smaller quantities of the heavy metal are effective. These soluble heavy metal complexes may be selected from a wide range of metals and also by the wide variety of organic complexes which fall within the above definition. However, as hereinafter indicated not all metals are immediately useful since it is well known in the art that the polymerization recipes must be critically adjusted for optimal results. Also of the many organic complexes as above defined only two are believed to be available commercially. Our best results have been achieved with ethylene dinitrilo tetra acetic acid

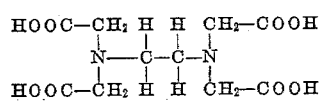

or more accurately since the reaction will be conducted in an alkaline medium, its Na, K or NH4 salts. Other salts of this polyacid would be satisfactory providing the metal ion is replaceable by the heavy metal ion which it is desired to sequester. Na and K salts are particularly advantageous although potassium salts are often preferred since higher polymerization rates may be observed when they are used. Ammonium salts are less acceptable as ammonia or its salts are not considered desirable in the polymerization mixture.

Reacting the soluble salt of the heavy metal selected with the organic complexes indicated we find that a soluble complex is formed which ionizes only to a very small degree. Using ferrous sulfate and the sodium salt of ethylene dinitrilo tetra acetic acid a complex is thought to result which according to the literature has the following formula:

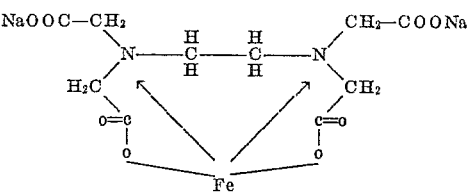

Similarly, if a sodium (or other soluble) salt of nitrilo triacetic acid is employed with ferrous sulfate the following complex results:

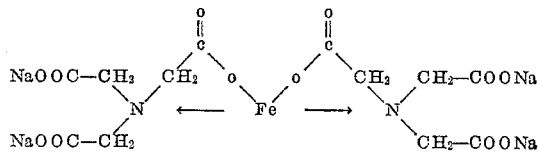

Another group of compounds are those in which the ammonia, amine or polyamine is substituted by aryl carboxylic groups, e. g. salicylic acid. In the practice of our invention this type of complex has not been found suitable but we believe that this material and its analogues can be used by proper adjusting of our experimental conditions.

Another group of compounds which we have found suitable are those in which the

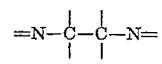

group is a part of a ring system. Of the compounds of this group which we have found suitable may be listed orthophenanthroline and a, a'-bipyridyl. These complexes must be prepared in mildly acid medium. A further detriment to the use of these complexes is the high cost of the organic compounds.

The preparation and application of such additives to low temperature peroxide initiated free radical polymerization systems will be adequately illustrated by the following examples:

*Example 1*

Compounding the additive normally is accomplished in the following manner:

To 10 parts of water add: 0.82 part of a 34% ((NaOOC—CH$_2$)$_2$—N—CH$_2$)$_2$ soln., 1.68 parts of 78% confectioners glucose, 0.03 parts FeSO$_4$.7H$_2$O, bring to a boil and boil for 5–10 minutes to digest the sugar. The resultant solution is uniform, clear and stable. Bring the solution up to weight with boiled water and add in the usual manner (just prior to the catalyst) to a variation of Recipe A, namely:

| | Parts |
|---|---|
| Butadiene | 71 |
| Styrene | 29 |
| Water (total) | 180 |
| Emulsifier | 5 |
| Na$_3$PO$_4$.10H$_2$O | 0.5 |
| Cumene hydroperoxide | 0.24 |
| Mixed tertiary mercaptan | 0.2 |
| NaOH | 0.025 |

66% conversion may be expected after 17 hours reaction at 41° F. Note that the FeSO$_4$.7H$_2$O has been reduced to 0.03 parts and that the solution is stable and uniform requiring no agitation.

*Example 2*

10 parts water
0.45 part of 34% ((NaOOC—CH$_2$)$_2$—N—CH$_2$)$_2$ soln.
0.30 part Na$_3$PO$_4$.10H$_2$O
0.90 part 100% dextrose
0.03 part FeSO$_4$.7H$_2$O when treated as in Example 1 and added to the same recipe from which Na$_3$PO$_4$.10H$_2$O is omitted 66% conversion of hydrocarbons results after reacting for 17 hours at 41° F.

*Example 3*

10 parts water
0.45 part 34% ((KOOC—CH$_2$)$_2$—N—CH$_2$)$_2$ soln.
0.90 part 100% dextrose
0.14 part FeSO$_4$.7H$_2$O
0.13 part KOH When treated as in Example 1 and added to a variation of Recipe B, namely:

| | Parts |
|---|---|
| Butadiene | 71 |
| Styrene | 29 |
| Water (total) | 180 |
| Emulsifier | 4.7 |
| KCl | 0.5 |
| Dispersing agent | 0.1 |
| Mixed tertiary mercaptan | 0.24 |
| Cumene hydroperoxide | 0.177 |

68% conversion of hydrocarbons resulted after 17 hours at 41° F.

*Example 4*

10 parts water
0.11 part of 34% nitrilo tri-acetic acid soln.
0.45 part dextrose
0.30 part Na$_3$PO$_4$.10H$_2$O
0.03 part FeSO$_4$.7H$_2$O When treated and used as in Example 2, 28% conversion of hydrocarbons resulted after 17 hours at 41° F. Though much lower than previous results the rate of reaction is nevertheless considered practical.

*Example 5*

The applicability of this activator to butadiene-acrylonitrile copolymerizations is illustrated by the preparation of a latex by the following recipe at 41° F:

| | Parts |
|---|---|
| Butadiene | 50 |
| Acrylonitrile | 50 |
| Cumene hydroperoxide | 0.1 |
| Mixed tertiary mercaptans | 0.1 |
| Sodium salt of disproportionated rosin acids | 4.7 |
| Potassium hydroxide | 0.13 |
| Potassium chloride | 0.50 |
| Dextrose | 1.0 |
| Dispersing agent | 0.10 |
| Water | 130 | and an activator composed entirely of sodium ethylene dinitrilo tetra acetate 0.15 part and water 10 parts. This reacted to 45% solids (100% conversion) in only 16 hrs. Note that in this example the chelate forming complex alone with the very small amounts of iron normally present in the reagents was sufficient to bring about an excellent rate of reaction.

Following the normal practice of adding the digested sugar solution separately, a series of activators each containing 0.14 part FeSO$_4$.7H$_2$O were made up with various inorganic, organic and chelate forming materials indicated except that with pyrophosphate the preferred practice was followed of aging at 140° F. for 30 minutes. All others were made up at room temperature. The conversion of hydrocarbons to polymer after 17 hours at 41° F. in each case is shown in the following table:

| Compound | Parts | pH | Conv. | Description |
|---|---|---|---|---|
| | | | Percent | |
| None | | | 11 | solution. |
| pyrophosphate | 0.17 | 9.9 | 78 | fine suspension. |
| ((KOOC—CH$_2$)$_2$—N—CH$_2$—)$_2$ | 0.45 | 12 | 73 | precipitate.[1] |
| ((NaOOC—CH$_2$)$_2$—N—CH$_2$—)$_2$ | 0.4 | 13 | 69 | Do.[1] |
| ortho-phenanthroline | 0.20 | 2.7 | 44 | solution. |
| a,a'-bipyridyl | 0.16 | 3.9 | 34 | Do. |
| nitrilo triacetic acid | 0.18 | 3.5 | 28 | Do. |
| | 0.53 | 4.0 | 27 | Do. |
| monastral blue | | | 6.2 | precipitate. |
| disalicyl-ethylene diamine | 0.32 | 12 | 5 | Do. |
| monastral green | | | 4.3 | Do. |
| K-salicylate | 0.33 | 6 | 31 | solution. |
| K-citrate | 0.34 | 10 | 69 | Do. |
| lactic acid | 0.42 | 7.0 | 34.5 | Do. |
| sodium thiosulfate pentahydrate | 0.49 | 6.4 | 27.4 | Do. |
| K-tartrate | 0.50 | 9.9 | 24 | Do. |
| potassium acid phthalate | 0.41 | 5.0 | 22.4 | Do. |
| Na-oxalate | 0.42 | 10.5 | 18 | percipitate. |
| K-phthalate | 0.14 | 5 | 22 | solution. |
| ferrous gluconate | 0.225 | 5.0 | 11.0 | Do. |
| K$_4$Fe(CN)$_6$ no additional Fe | 0.21 | | 6 | Do. |
| no activator at all | | | 3.0 | |
| arsenious oxide | 0.1 | 12.4 | 2.8 | precipitate. |
| tannic acid | 0.65 | 3.9 | 1.0 | solution. |
| ferrous phthalocyanine | 0.29 | | 0.0 | Do. |

[1] In some cases a precipitate may form, presumably due to ferric iron formation. For protection against oxygen it may be advantageous to add the sugar either after digesting with alkali or without previous digestion. Such activators are active and completely or largely free of precipitation. Alternatively, completely soluble activators may be prepared by adjusting the pH to lower values.

In considering the suitability of various heavy metallic salts, activators for use in a variation of Recipe B were prepared with a constant amount, 0.45 part, of ((KOOC—CH$_2$)$_2$—N—CH$_2$)$_2$ and the indicated quantities of the various salts.

With the reaction conducted at 41° F. the following results were recorded:

| Metal | Amt., Parts | pH | Conv. | Time |
|---|---|---|---|---|
| | | | | Hours |
| ferrous sulfate heptahydrate | 0.140 | 12 | 68.0 | 17 |
| ferrous ammonium sulfate hexahydrate | 0.188 | 9.97 | 57.0 | 17 |
| ferric sulfate monohydrate | 0.142 | 10.18 | 49.6 | 17 |
| aluminium sulfate hexadecylhydrate | 0.168 | 9.85 | 31.4 | 16 |
| uranyl acetate dihydrate | 0.214 | 9.86 | 30.0 | 17 |
| molybdenum trioxide | 0.053 | 10.12 | 28.6 | 17 |
| silver nitrate | 0.086 | 12.2 | 27.4 | 17 |
| chromous chloride | 0.07 | 5.6 | 26.7 | 17 |
| stannous chloride dihydrate | 0.114 | [1] 10.7 | 25.0 | 17 |
| no metal at all | | 13 | 21.8 | 17 |
| sodium tungstate dihydrate | 0.166 | 12.27 | 21.1 | 17 |
| calcium chloride | 0.058 | 12.26 | 19.9 | 17 |
| mercuric iodide | 0.229 | 10.3 | 15.9 | 17 |
| arsenious oxide | 0.1 | 10.02 | 13.0 | 17 |
| copper sulfate pentahydrate | 0.126 | 12.0 | 9.1 | 17 |
| nickel nitrate hexa hydrate | 0.146 | 10.1 | 2.9 | 17 |
| cadmium chloride | 0.092 | 12.2 | 2.6 | 16 |
| manganous chloride tetra hydrate | 0.0096 | 12.2 | 2.2 | 17 |
| cobaltous nitrate hexahydrate | 0.1464 | 10.0 | 2.1 | 17 |
| cobaltous chloride hexahydrate | 0.109 | 12.2 | 1.9 | 16 |
| lead acetate trihydrate | 0.191 | 10.2 | 1.1 | 17 |
| zinc chloride | 0.5 | 11.8 | 0 | 17 |
| cuprous chloride | 0.1 | 0.5 | 0.0 | 17 |

[1] Precipitate formed.

Various additives were prepared according to the following pattern for use in a variation of Recipe A (see Example 2):

10 parts water.
0.45 parts 34% active
$((NaOOC-CH_2)_2-N-CH_2)_2$ soln.
0.30 parts $Na_3PO_4.10H_2O$.
0.45 parts 100% dextrose (50% of quantity in Example 2).
indicated quantity of metal salt.

The reaction was run for 17 hours at 41° F. and the following conversions recorded:

| | Parts | Percent Conversion |
|---|---|---|
| ferrous sulfate heptahydrate | 0.028 | 57.0 |
| stannous chloride dihydrate | 0.045 | 27.1 |
| chromous sulfate pentahydrate | 0.12 | 12.5 |
| copper sulfate | 0.032 | 8.6 |
| no metal | | 6.0 |
| mercurous chloride | 0.047 | 5.7 |
| cobaltous nitrate hexahydrate | 0.058 | 5.3 |
| cobaltous chloride hexahydrate | 0.048 | 3.5 |
| nickel nitrate | 0.058 | 2.2 |
| calcium chloride | 0.038 | 1.6 |
| manganous sulfate tetrahydrate | 0.045 | 0.9 |
| lead acetate trihydrate | 0.076 | 0.3 |

These two tables illustrate the effect of concentration or recipe on the relative effectiveness of various metals. It follows that where another metal is substituted for iron an improved conversion might be achieved by adjusting the recipes, concentrations, etc.

Whereas in Example 3, 0.14 part of $FeSO_4.7H_2O$ were used the following table illustrates the effect of reducing this quantity or even eliminating the salt completely while still maintaining practical rates.

| $FeSO_4.7H_2O$, parts | Percent Conversion, 17 hrs. @ 41° F. |
|---|---|
| 0.14 | 68.0 |
| 0.10 | 67.3 |
| 0.075 | 65.7 |
| 0.05 | 64.4 |
| 0.025 | 61.7 |
| 0.0 | 21.8 |

By comparison it may be pointed out that in a pyrophosphate activator if $FeSO_4.7H_2O$ is reduced from 0.14 to 0.112 conversion is reduced from 78% to 60.3%. This lack of sensitivity to amount of iron is an unexpected and desirable characteristic of this invention.

Further unexpected advantages are found in its insensitivity to technical errors, and the variations in technique of charging as compared with the critical conditions imposed by a ferrous pyrophosphate activator. In the following illustrations, being variations of Recipe B, the reactions were run for 17 hours at 41° F. Whereas the normal practice is to charge the soap masterbatch (emulsifier, KOH, dispersing agent and KCl and sugar), the styrene and modifier, the butadiene, then cool and inject activator and finally catalyst in each case the practice of making up the activator in larger volume, i. e. 40 parts (4 times normal) of water and charging ahead of butadiene has been followed:

| Variations in Charging—Recipe B | Conv., Percent | Variations in Charging—Example III | Conv., Percent |
|---|---|---|---|
| 1. Normal | 78 | Normal | 68 |
| 2. Ferrous pyrophosphate activator made up in 4 times normal water dextrose digested in 40 parts 0.1% KOH added both ahead of hydrocarbons. | 49.4 | Potassium ethylene dinitrilo tetra acetate made up in 4 times normal water. Invert sugar undigested. Added ahead of hydrocarbons. | 42.4 |
| 3. Dextrose digested with pyrophosphate in 40 parts water cooled to 140° F. $FeSO_4.7H_2O$ added, aged 140° F. for 30 min. Added ahead of hydrocarbons. | 53.7 | Invert sugar and potassium ethylene dinitrilo tetra acetate dissolved in 40 parts water and $FeSO_4.7H_2O$ added—all added ahead of hydrocarbons. | 36.1 |
| 4. Dextrose digested with pyrophosphate in 40 parts water, added to soap masterbatch, cooled to 140° F., $FeSO_4.7H_2O$ added aged 10 min. @ 140° F. | 27.4 | Invert sugar and potassium ethylene dinitrilo tetra acetate dissolved in 40 parts water, mixed with soap masterbatch $FeSO_4.7H_2O$ added ahead of hydrocarbons. | 45.3 |
| 5. Dextrose, soap masterbatch and pyrophosphate made up in 40 parts water, digested, cooled to 140° F, $FeSO_4.7H_2O$ added and the whole aged 30 min. at 140° F. | 35.1 | Same as above since no digestion. | |
| 6. Same as above but unaged at 140° F. | 38.5 | do | |

We claim:

1. The process which comprises causing substances selected from the group consisting of butadiene-1,3 and admixtures thereof with copolymerizable compounds to polymerize at a low temperature with a peroxy initiator in aqueous emulsion in the presence of a water-soluble organic chelate complex of a salt of ethylene dinitrilo tetra acetic acid and iron and an alkali metal.

2. The process which comprises causing substances selected from the group consisting of butadiene-1,3 and admixtures thereof with copolymerizable compounds to polymerize at low temperature with a peroxy initiator in aqueous emulsion in the presence of an activating sugar and of a water-soluble organic chelate complex of a salt of ethylene dinitrilo tetra acetic acid and iron and an alkali metal.

3. The process which comprises causing substances selected from the group consisting of conjugated dienes and admixtures thereof with copolymerizable compounds to polymerize with a peroxy initiator in aqueous emulsion in the presence of a water-soluble organic chelate complex of a compound selected from the group consisting of compounds of the general formula

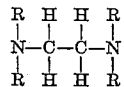

and water-soluble salts thereof, R being an alkyl carboxyl group.

4. The process which comprises causing substances selected from the group consisting of butadiene-1,3 and admixtures thereof with copolymerizable compounds to polymerize with a peroxy initiator in aqueous emulsion in the presence of a water-soluble organic chelate complex of a compound selected from the group consisting of compounds of the general formula

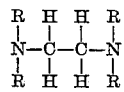

and water-soluble salts thereof, R being an alkyl carboxyl group.

5. The process which comprises causing substances selected from the group consisting of conjugated dienes and admixtures thereof with copolymerizable compounds to polymerize at a low temperature with a peroxy initiator in aqueous emulsion in the presence of a water-soluble organic chelate complex of a compound selected from the group consisting of compounds of the general formula

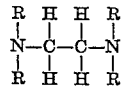

and water-soluble salts thereof, R being an alkyl carboxyl group.

6. The process which comprises causing substances selected from the group consisting of conjugated dienes and admixtures thereof with copolymerizable compounds to polymerize with a peroxy initiator in aqueous emulsion in the presence of an activating sugar and of a water-soluble organic chelate complex of a compound selected from the group consisting of compounds of the general formula

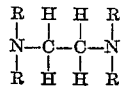

and water-soluble salts thereof, R being an alkyl carboxyl group.

7. The process which comprises causing substances selected from the group consisting of conjugated dienes and admixtures thereof with copolymerizable compounds to polymerize with a peroxy initiator in aqueous emulsion in the presence of a water-soluble organic chelate complex of ethylene dinitrilo tetra acetic acid.

8. The process which comprises causing substances selected from the group consisting of conjugated dienes and admixtures thereof with copolymerizable compounds to polymerize with a peroxy initiator in aqueous emulsion in the presence of a water-soluble organic chelate complex of a water-soluble salt of ethylene dinitrilo tetra acetic acid.

9. The process which comprises causing substances selected from the group consisting of butadiene-1,3 and admixtures thereof with copolymerizable compounds to polymerize at a low temperature with a peroxy initiator in aqueous emulsion in the presence of a water-soluble organic chelate complex of ethylene dinitrilo tetra acetic acid.

10. The process which comprises causing substances selected from the group consisting of butadiene-1,3 and admixtures thereof with copolymerizable compounds to polymerize at a low temperature with a peroxy initiator in aqueous emulsion in the presence of a water-soluble organic chelate complex of a water-soluble salt of ethylene dinitrilo tetra acetic acid.

11. The process which comprises causing substances selected from the group consisting of butadiene-1,3 and admixtures thereof with copolymerizable compounds to polymerize at low temperature with a peroxy initiator in aqueous emulsion in the presence of an activating sugar and of a water-soluble organic chelate complex of ethylene dinitrilo tetra acetic acid.

12. The process which comprises causing substances selected from the group consisting of butadiene-1,3 and admixtures thereof with copolymerizable compounds to polymerize at low temperature with a peroxy initiator in aqueous emulsion in the presence of an activating sugar and of a water-soluble organic chelate complex of a water-soluble salt of ethylene dinitrilo tetra acetic acid.

13. The process which comprises causing substances selected from the group consisting of conjugated dienes and admixtures thereof with copolymerizable compounds to polymerize with a peroxy initiator in aqueous emulsion in the presence of a water-soluble organic chelate complex of an iron salt of a compound selected from the group consisting of compounds of the general formula

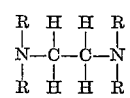

and water-soluble salts thereof, R being an alkyl carboxyl group.

14. The process which comprises causing substances selected from the group consisting of butadiene-1,3 and admixtures thereof with copolymerizable compounds to polymerize with a peroxy initiator in aqueous emulsion in the presence of a water-soluble organic chelate complex of an iron salt of a compound selected from the group consisting of compounds of the general formula

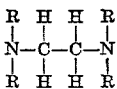

and water-soluble salts thereof, R being an alkyl carboxyl group.

15. The process which comprises causing substances selected from the group consisting of conjugated dienes and admixtures thereof with copolymerizable compounds to polymerize at a low temperature with a peroxy initiator in aqueous emulsion in the presence of a water-soluble organic chelate complex of an iron salt of a compound selected from the group consisting of compounds of the general formula

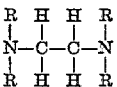

and water-soluble salts thereof, R being an alkyl carboxyl group.

16. The process which comprises causing substances selected from the group consisting of conjugated dienes and admixtures thereof with copolymerizable compounds to polymerize with a peroxy initiator in aqueous emulsion in the presence of an activating sugar and of a water-soluble organic chelate complex of an iron salt of a compound selected from the group consisting of compounds of the general formula

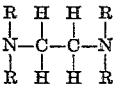

and water-soluble salts thereof, R being an alkyl carboxyl group.

17. The process which comprises causing substances selected from the group consisting of conjugated dienes and admixtures thereof with copolymerizable compounds to polymerize with a peroxy initiator in aqeous emulsion in the presence of a water-soluble organic chelate complex of an iron salt of ethylene dinitrilo tetra acetic acid.

18. The process which comprises causing substances selected from the group consisting of conjugated dienes and admixtures thereof with copolymerizable compounds to polymerize with a peroxy initiator in aqueous emulsion in the presence of a water-soluble organic chelate complex of an iron salt of a water-soluble salt of ethylene dinitrilo tetra acetic acid.

19. The process which comprises causing substances selected from the group consisting of butadiene-1,3 and admixtures thereof with copolymerizable compounds to polymerize at a low temperature with a peroxy initiator in aqueous emulsion in the presence of a water-soluble organic chelate complex of an iron salt of ethylene dinitrilo tetra acetic acid.

20. The process which comprises causing substances selected from the group consisting of butadiene-1,3 and admixtures thereof with copolymerizable compounds to polymerize at a low temperature with a peroxy initiator in aqueous emulsion in the presence of a water-soluble organic chelate complex of an iron salt of a water-soluble salt of ethylene dinitrilo tetra acetic acid.

21. The process which comprises causing substances selected from the group consisting of butadiene-1,3 and admixtures thereof with copolymerizable compounds to polymerize at a low temperature with a peroxy initiator in aqueous emulsion in the presence of an activating sugar and of a water-soluble organic chelate complex of an iron salt of ethylene dinitrilo tetra acetic acid.

22. The process which comprises causing substances selected from the group consisting of butadiene-1,3 and admixtures thereof with copolymerizable compounds to polymerize at a low temperature with a peroxy initiator in aqueous emulsion in the presence of an activating sugar and of a water-soluble organic chelate complex of an iron salt of a water-soluble salt of ethylene dinitrilo tetra acetic acid.

H. LEVERNE WILLIAMS.
J. MAXWELL MITCHELL.

REFERENCES CITED

The following references are of record in the file of this patent:

UNITED STATES PATENTS

| Number | Name | Date |
|---|---|---|
| 2,578,910 | Uraneck | Dec. 18, 1951 |

OTHER REFERENCES

Williams, "The Rubber Age," April 1949, page 55.